UNITED STATES PATENT OFFICE.

WILLIAM H. RANKIN, OF ELIZABETH, NEW JERSEY.

IMPROVEMENT IN ROOFING.

Specification forming part of Letters Patent No. 211,669, dated January 28, 1879; application filed November 9, 1878.

*To all whom it may concern:*

Be it known that I, WILLIAM H. RANKIN, of the city of Elizabeth, in the county of Union and State of New Jersey, have invented a new and useful Improvement in Roofing, of which the following is a full, clear, and exact description.

My invention consists in a new article of manufacture, composed of two or more sheets of roofing-felt or roofing-paper saturated with a composition consisting of dead-oil, rosin, an acid, a drier, and mineral substance, such as Lehigh metallic or Prince's metallic paint, (pulverized,) in substantially the following proportions—that is to say, of rosin, one hundred pounds; of dead-oil, eighteen gallons; of sugar of lead, three pounds; of sulphuric acid, two ounces; and of the mineral substance, one hundred and fifty pounds and upward, being the composition patented to me by Letters Patent of the United States bearing date the 18th day of June, 1878, which sheets, saturated with said composition, are caused to adhere together by an interposed layer (or interposed layers, where more than two sheets are used) of a mixture consisting of pine-tar and rosin combined in such proportions that the mixture will be a thin liquid when hot, a thick pasty mass when warm, and solidify upon cooling. The proportions of the ingredients of the mixture will vary considerably, according to the temperature of the weather, and according to the quality of the rosin and the tar; but about twenty pounds of the rosin to the gallon of tar are the proper proportions under ordinary circumstances. The resinous mixture should form a distinct layer between the sheets of the saturated paper, and as such it will materially add to the durability of the roofing. This layer of the resinous composition is to be interposed in a heated state, and by employing proper pressure upon the external surfaces of the sheets of saturated paper the resinous material adheres closely to the saturated papers, and a solid, compact roofing is the result. The rosin and tar will readily mix together when heated.

I put any desirable quantity of the rosin in a suitable kettle over a fire, and when it has become melted I add sufficient of the tar to produce a mixture of the necessary degree of fluidity. The proportions above stated will generally be found to be correct. In this heated state the mixture is then put between the sheets of my saturated roofing-paper, and suitable pressure is applied to cause the material to spread out evenly between the sheets. Upon coming in contact with the surfaces of the papers the material adheres closely, and, at the same time, parts with enough of its heat to chill or solidify sufficiently to prevent it from running or being expressed to too great an extent, and thereby a layer or layers of varying thicknesses are formed between the sheets of the saturated paper. While yet warm the manufactured article is rolled up in rolls of suitable size for the market.

What I claim as new, and desire to secure by Letters Patent, is—

The new article of manufacture hereinbefore described, consisting of two or more layers of the saturated roofing-paper above described, with interposed adhering layers of pine-tar and rosin, mixed in substantially the proportions above set forth.

WM. H. RANKIN.

Witnesses:
SAMUEL OPPENHEIM,
JOS. S. MICHAEL.